March 23, 1926.  1,577,576

T. M. HAMILTON

ELECTRICALLY HEATED STEERING WHEEL

Filed Dec. 26, 1924

WITNESSES
L. Goodman

INVENTOR
T. M. Hamilton
BY
ATTORNEY

Patented Mar. 23, 1926.

1,577,576

UNITED STATES PATENT OFFICE.

TYRE MARCELLUS HAMILTON, OF HAPEVILLE, GEORGIA.

ELECTRICALLY-HEATED STEERING WHEEL.

Application filed December 26, 1924. Serial No. 758,169.

*To all whom it may concern:*

Be it known that I, TYRE M. HAMILTON, a citizen of the United States, residing at Hapeville, in the county of Fulton and State of Georgia, have invented new and useful Improvements in Electrically-Heated Steering Wheels, of which the following is a specification.

This invention relates to steering wheels for motor vehicles of any type, and has for its primary object the provision of a steering wheel equipped with means for effecting heating thereof in order that the driver's hands will be kept warm and comfortable.

In carrying out this object I provide a steering wheel with a rim of insulating material enclosing a coil of resistance wire through which current may be passed for obtaining the heating effect, the rim being supported from or upon the spokes of the wheel in a novel manner, whereby to insure the desired strength, the mounting means being of such construction that the rim may be easily replaced if this becomes necessary for any reason.

Figure 1:
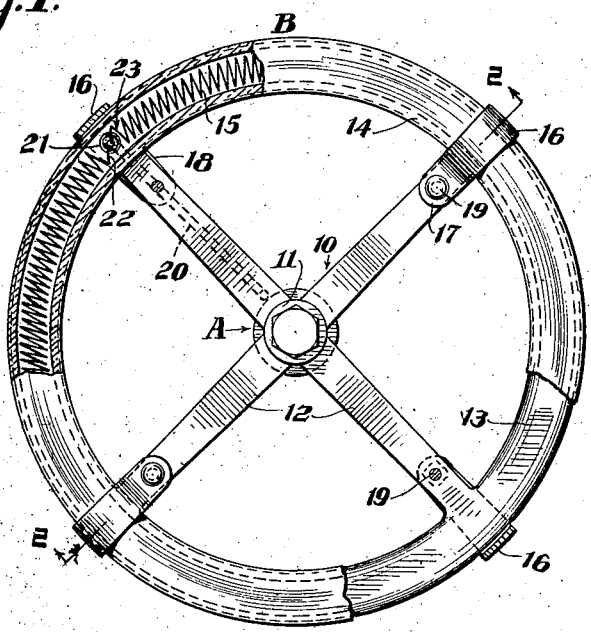
Figure 2:
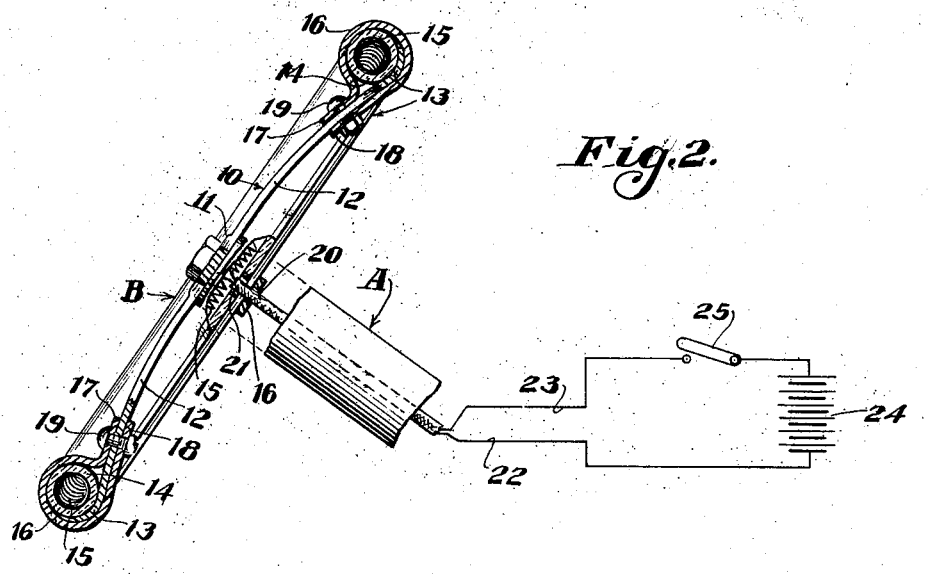

To the attainment of the foregoing and other objects and advantages, the invention consists in the details of construction and arrangement of parts to be hereinafter more fully described and claimed, and illustrated in the accompanying drawings in which:

Figure 1 is an elevation of a steering wheel constructed in accordance with my invention, a portion of the rim being broken away entirely and another portion thereof being shown in section to disclose the resistance coil therein; and Figure 2 is a cross section on the line 2—2 of Figure 1, and showing a diagram of the electric circuit.

Referring more particularly to the drawings, the letter A designates the steering post or column of a vehicle such as an automobile, motor boat, or the like, which post carries the wheel designated generally by the letter B.

I construct the wheel as a spider 10, including a hub portion 11 and spokes 12 radiating therefrom and carrying a ring 13 which is preferably concaved. A convenient construction is for these elements to be integral in order to avoid assembling a number of parts, though it should be understood that there is no particular limitation in this respect. The hub portion of the wheel is secured with respect to the steering column or post in a conventional manner, this detail being immaterial.

Supported upon the ring 13 is the rim 14 which is intended to be constructed of such insulating material as glass, which might be transparent or opaque as preferred. This rim is tubular in form, and enclosed therein is a resistance coil 15, adapted to have current supplied therethrough for the purpose of generating heat.

Obviously, some means must be provided for securing the rim with respect to the remainder of the wheel, and in carrying out this feature I preferably make use of metallic clips or clamps 16, which are embracingly engaged about the ring 13 and rim 14, as clearly indicated in the drawings, these clips terminating in attaching ears 17 and 18 located at opposite sides of the spokes, and secured thereto by means of suitable fastening elements, such as the bolts, indicated at 19, though the securing might be effected in any other manner, as by rivets or by welding. However, the bolts are probably the most suitable securing means, inasmuch as they may be removed to permit detachment of the clips and removal of the rim, in case such is necessary on account of breakage thereof or for any other reason.

Current may be supplied to the resistance coil in any desired manner, though I have illustrated the use of a two wire cable 20, which is brought up through or alongside the steering post or column and led along beneath or through one of the spokes, as preferred, and led into the tubular rim 14 through a suitable bushing 21, passing through necesssary holes in the ring 13 and one of the clips 16, one wire 22 of the loom being connected with one terminal of the coil, and the other wire 23 being connected with the other terminal. The wires 22 and 23 are connected with some suitable source of current indicated at 24, which may in actual practice be the storage battery of the car or other vehicle, or which might in some instances be the magneto thereof. Any preferred type of switch 25 may be included in the circuit at any desired point for cutting the current off or on at will.

In the use of the device, it is quite apparent that when the switch 25 is closed, current will flow through the resistance coil 15 and result in the generation of heat which will be conducted to the hands of the operator or driver. The device will be a great convenience for winter driving, inasmuch as it will insure comfort and prevent cramped and frost-bitten fingers. The advantage of employing glass or its equivalent as the material from which the ring is formed is that such material is a non-conductor of electricity, and obviously its employment will avoid any possibility of short circuiting the resistance coil, or permitting any current leaks which might result in shocks to the operator or driver. Even though glass is considered ordinarily as more or less fragile, it is quite apparent that in the present instance the glass rim is adequately braced and supported by the concaved ring, upon which it is seated, so that the wheel will be fully as strong as when constructed from wood or other solid material.

While I have shown and described the preferred embodiment of the invention, it will be apparent that the size, finish and such details may be left to the judgment of the individual manufacturer. I also reserve the right to make such changes in the form, construction and arrangement of parts as will not depart from the spirit of the invention or the scope of the appended claims.

What is claimed is:—

1. In a steering wheel, a relatively stationary portion including spokes carrying a metallic concaved ring, a rim of tubular insulating material mounted on and supported by the ring, a resistance coil within the tubular rim, and means for securing the rim upon the ring comprising clips embracingly engaging the rim and ring and detachably secured in place.

2. A steering wheel comprising a hub having spokes radiating therefrom, a concaved ring carried by the spokes, a tubular rim mounted upon and supported by the ring, a resistance coil within the rim and a plurality of clips embracingly engaging the rim and the ring and terminating in ears engaging the spokes at opposite sides thereof and secured thereto.

In testimony that I claim the foregoing as my own, I have hereto affixed my signature.

TYRE MARCELLUS HAMILTON.